(12) United States Patent
Coker et al.

(10) Patent No.: US 10,275,781 B2
(45) Date of Patent: Apr. 30, 2019

(54) SYSTEMS AND METHODS FOR GENERATING, REVIEWING, EDITING, AND TRANSFERRING AN ADVERTISING UNIT IN A SINGLE ENVIRONMENT

(75) Inventors: Erin Coker, Atlanta, GA (US); Aleksei Tolompoiko, Cummming, GA (US); Justin Haygood, Marietta, GA (US); Alfred Xavier, Cumming, GA (US)

(73) Assignee: Sizmek Technologies, Inc., Atlanta, GA (US)

( * ) Notice: Subject to any disclaimer, the term of this patent is extended or adjusted under 35 U.S.C. 154(b) by 582 days.

(21) Appl. No.: 12/332,823

(22) Filed: Dec. 11, 2008

(65) Prior Publication Data
US 2009/0083158 A1   Mar. 26, 2009

Related U.S. Application Data

(63) Continuation of application No. 12/209,715, filed on Sep. 12, 2008, which is a continuation of application No. 12/131,842, filed on Jun. 2, 2008.
(Continued)

(51) Int. Cl.
*G06Q 30/02* (2012.01)

(52) U.S. Cl.
CPC ......... *G06Q 30/02* (2013.01); *G06Q 30/0236* (2013.01); *G06Q 30/0241* (2013.01); *G06Q 30/0277* (2013.01)

(58) Field of Classification Search
USPC ............... 707/1; 715/255, 501.1; 719/328; 345/473; 713/157; 434/262; 709/219;
(Continued)

(56) References Cited

U.S. PATENT DOCUMENTS 5,799,320 A    8/1998  Klug
6,006,279 A *  12/1999 Hayes .................. 719/328
(Continued)

FOREIGN PATENT DOCUMENTS

| JP | 2000293515 | 10/2000 |
| JP | 2005032104 | 2/2005 |
| JP | 2005167669 | 6/2005 |

OTHER PUBLICATIONS

"Eyeblaster to Use Microsoft Silverlight for Development of High-Impact Rich Media Advertising". Business Wire. Apr. 16, 2007.
(Continued)

*Primary Examiner* — Saba Dagnew
(74) *Attorney, Agent, or Firm* — M&B IP Analysts, LLC

(57) ABSTRACT

This invention is directed to embodiments of systems and methods for generating, reviewing, editing, and transmitting an advertising unit in a single environment. In one embodiment, a method can include executing an ad unit component module program adapted to operate in a single environment. The method can further include simultaneously executing an authoring tool program to facilitate the single environment, wherein the authoring tool program is adapted by the ad unit component module program to provide functionality associated with authoring tool program. Furthermore, the method can include utilizing at least one tool associated with the ad unit component module program, wherein the at least one tool is adapted to generate an advertising unit in the single environment.

24 Claims, 12 Drawing Sheets

Related U.S. Application Data

(60) Provisional application No. 60/941,198, filed on May 31, 2007.

(58) Field of Classification Search
USPC .......................................................... 725/35
See application file for complete search history.

(56) References Cited

U.S. PATENT DOCUMENTS

| | | |
|---|---|---|
| 6,208,345 B1 | 3/2001 | Sheard et al. |
| 6,551,107 B1* | 4/2003 | Buckley et al. ............. 434/262 |
| 6,789,105 B2 | 9/2004 | Ludwig et al. |
| 6,871,216 B2 | 3/2005 | Miller et al. |
| 7,039,857 B2 | 5/2006 | Beck et al. |
| 7,249,059 B2 | 7/2007 | Dean et al. |
| 7,313,564 B2* | 12/2007 | Melamed et al. ............ 707/101 |
| 7,870,577 B2* | 1/2011 | Haberman et al. ............. 725/35 |
| 2002/0063714 A1* | 5/2002 | Haas et al. .................... 345/473 |
| 2002/0128908 A1 | 9/2002 | Levin et al. |
| 2002/0194151 A1* | 12/2002 | Fenton et al. .................... 707/1 |
| 2002/0194194 A1 | 12/2002 | Fenton et al. |
| 2002/0194215 A1 | 12/2002 | Cantrell et al. |
| 2003/0046152 A1 | 3/2003 | Colas et al. |
| 2003/0163375 A1 | 8/2003 | Dombrowski et al. |
| 2004/0015562 A1 | 1/2004 | Harper et al. |
| 2004/0104926 A1 | 6/2004 | Murray et al. |
| 2004/0201610 A1 | 10/2004 | Rosen et al. |
| 2005/0004885 A1* | 1/2005 | Pandian et al. .................... 707/1 |
| 2005/0171844 A1 | 8/2005 | Ferber et al. |
| 2005/0240596 A1 | 10/2005 | Worthen et al. |
| 2006/0015355 A1 | 1/2006 | Wolkoff et al. |
| 2006/0155604 A1 | 7/2006 | Bard |
| 2006/0069613 A1 | 8/2006 | Marquardt |
| 2006/0190808 A1 | 8/2006 | Balthaser |
| 2006/0224444 A1 | 10/2006 | Koningstein et al. |
| 2006/0248442 A1* | 11/2006 | Rosenstein et al. ....... 715/501.1 |
| 2006/0259588 A1* | 11/2006 | Lerman et al. ............. 709/219 |
| 2007/0022382 A1 | 1/2007 | Honkaniemi |
| 2007/0044010 A1 | 2/2007 | Sull et al. |
| 2007/0150353 A1 | 6/2007 | Krassner et al. |
| 2007/0156524 A1 | 7/2007 | Grouf et al. |
| 2007/0174774 A1 | 7/2007 | Lerman et al. |
| 2007/0204057 A1 | 8/2007 | Shaver et al. |
| 2007/0209005 A1 | 9/2007 | Shaver et al. |
| 2007/0250705 A1* | 10/2007 | Smith et al. .................. 713/157 |
| 2008/0034277 A1 | 2/2008 | Hong |
| 2008/0098032 A1* | 4/2008 | Wu ............................. 707/104.1 |
| 2008/0201311 A1 | 8/2008 | Ertugrul et al. |
| 2008/0208690 A1 | 8/2008 | Lim |
| 2008/0215968 A1* | 9/2008 | Bekerman ..................... 715/255 |
| 2008/0235088 A1 | 9/2008 | Weyer et al. |
| 2008/0249855 A1 | 10/2008 | Collins et al. |
| 2008/0255937 A1 | 10/2008 | Chang et al. |
| 2008/0300989 A1 | 12/2008 | Coker et al. |
| 2009/0006215 A1 | 1/2009 | Coker et al. |

OTHER PUBLICATIONS

Plonka, J., Create Ad Banners for the Web in a Snap, InfoWorld, Apr. 19, 1999, p. 52, vol. 2, No. 16, InfoWorld Publications.

"Electric Rain's New Harmony Application Lets Designers Use Flash Content in Windows Presentation Foundation and Silverlight" [http://goliath.ecnext.com/coms2/gi_0199-6485137/Electric-Rain-s-New-Harmony.html].

"Real-Time Joint Editing and Review," [http://www.shared-spaces.com/reports/files/SevenPillarsPillarlpdf].

"Nine Systems Partners With Talkpoint to Offer End-To-End Rich Media Management and Delivery Solutions, [" http://www.freshnews.com/news/computers-internet/article_34938.html?Talkpoint].

"Adobe PDF in Creative Workflows," [http://www.adobe.com/designcenter/acrobat/articles/acr8ap_pdfworkflows_08.html].

U.S. Appl. No. 12/209,715, Office Action dated May 13, 2009, 11 pages.

U.S. Appl. No. 12/209,715, Supplemental Office Action dated Jun. 16, 2009, 10 pages.

U.S. Appl. No. 12/131,842, Office Action dated Oct. 27, 2010, 13 pages.

\* cited by examiner

SYSTEMS AND METHODS FOR GENERATING, REVIEWING, EDITING, AND TRANSFERRING AN ADVERTISING UNIT IN A SINGLE ENVIRONMENT

RELATED APPLICATIONS

This application is a continuation of U.S. Non-Provisional application Ser. No. 12/209,715, entitled "Systems and Methods for Generating, Reviewing, Editing, and Transmitting an Advertising Unit in a Single Environment," filed Sep. 12, 2008, which is a continuation of U.S. Non-Provisional application Ser. No. 12/131,842, entitled "Systems and Methods for Generating, Reviewing, Editing, and Transmitting an Advertising Unit in a Single Environment," filed Jun. 2, 2008, which claims priority to U.S. Provisional Application Ser. No. 60/941,198, entitled "Systems and Methods for Generating, Reviewing, and Editing an Advertising Unit in a Flash Environment," filed May 31, 2007. All of the foregoing applications are incorporated as is fully set forth herein.

FIELD OF THE INVENTION

This invention relates to advertising media, and in particular, relates to systems and methods for generating, reviewing, editing, and transmitting an advertising unit in a single environment.

BACKGROUND OF THE INVENTION

As consumers continue to use the Internet to shop, browse, and spend time online, online advertising by businesses has increased dramatically. Different types of online advertising have been developed including banner ads, floating ads, expanding ads, pop-ups, pop-unders, and videos, among others. Many businesses outsource the creation of their online advertising to developers or advertising agencies who may work with their clients to create an online ad. Developers and advertising agencies have used various conventional tools and programs, such as software application programs, to develop online advertising for viewing on the Internet. In many instances, the exchange of information between a developer or an advertising agency, and a client can be a relatively complex process. Often times, the process includes the exchange of different drafts of an online ad until the client approves the ad for online publication or release. For many reasons, conventional tools and programs may be cumbersome and time consuming when used to combine the processes for modifying an online ad and exchanging drafts of an online ad. One drawback of conventional tools and programs is that such tools and programs may not accommodate differences in computer equipment, thus causing revisions in an online ad to be difficult to implement. Another drawback of conventional tools and programs is that such tools and programs require significant customization to provide suitable functionality to track the online advertising units once they have been transferred and are available to an Internet user. Another drawback of conventional tools and programs is that such tools and programs may require users to separate the process of revising an online ad from the process of exchanging various files containing the online advertising content in a network environment. This separation of processes creates complexity in both the processes and the environments which slows those processes and often relates to higher levels of failure. Further, the lack of integration for the processes into the development environment used by the developer and agency can perpetuate the inefficiencies in the conventional processes.

Therefore, a need exists for systems and methods for generating, reviewing, editing, and transmitting an advertising unit in a single environment.

Furthermore, a need exists for systems and methods for generating, reviewing, editing, and transmitting a rich media advertising unit in a single environment.

Furthermore, a need exists for systems and methods for providing tracking capabilities within an advertising unit in a single environment.

Furthermore, a need exists for systems and methods for providing tracking capabilities within a rich media advertising unit in a single environment.

SUMMARY OF THE INVENTION

Systems and methods according to various aspects and embodiments of the invention address some or all of these issues and combinations of them. They do so by providing at least one system and method for generating, reviewing, editing, and transmitting an advertising unit in a single environment. Furthermore, embodiments can provide a system for generating, reviewing, editing, and transmitting a rich media advertising unit in a single environment. For example, in one system embodiment, an advertising unit designer can work with a customer, such as an advertising agency, to design and test an advertising unit, such as a rich media advertising unit which incorporates one or more videos, related ad content, and suitable tracking capability within a single environment, such as a Flash environment. The system can provide both the designer and the customer with a set of tools, such as drag and drop-type components, to add, modify, edit, and transfer the advertising unit of interest. Using the system, both the designer and the advertising agency can review and edit the advertising unit in the single environment, such as a Flash or Silverlight environment, and the process for developing the resulting advertising unit can be streamlined to permit relatively efficient transfer of the advertising unit. In one embodiment, a system can provide a user with a plug-in component to a Flash or Silverlight environment which allows the user to create and test an advertising unit, such as a rich media video, in a single environment such as a Flash or Silverlight environment, and then transfer that advertising unit without leaving the Flash or Silverlight environment. In another embodiment, a system can provide a user with a plug-in component to facilitate a single environment, such as a Flash or Silverlight environment, which allows the user to automatically create various tracking capabilities as part of the creation and testing of an advertising unit.

Embodiments of the invention can include systems and methods for generating, reviewing, editing, and transmitting an advertising unit in a single environment. In one embodiment, a method can include executing an ad unit component module program adapted to operate in a single environment. The method can further include simultaneously executing an authoring tool program to facilitate the single environment, wherein the authoring tool program is adapted by the ad unit component module program to provide functionality associated with authoring tool program. Furthermore, the method can include utilizing at least one tool associated with the ad unit component module program, wherein the at least one tool is adapted to generate an advertising unit in the single environment.

In another embodiment, a method can include simultaneously executing an ad unit component module program and an authoring tool program, wherein the authoring tool program is adapted to facilitate execution of the ad unit component module program in a single environment, and wherein the authoring tool program is adapted by the ad unit component module program to provide functionality associated with authoring tool program. The method can further include, within the single environment, generating an advertising unit with at least one tool associated with the ad unit component module program. In addition, the method can include, within the single environment, receiving edited content for the advertising unit from at least one user. Further, the method can include, within the single environment, modifying the advertising unit based at least in part on the received edited content.

In yet another embodiment, a system can include an ad generation component module program adapted to operate in a single environment. The system can also include an authoring tool program adapted to facilitate the single environment, and further adapted to simultaneously execute with the ad generation component module, wherein the authoring tool program is adapted by the ad unit component module program to provide functionality associated with authoring tool program. Furthermore, the system can include wherein the ad generation component module program comprises at least one tool adapted to generate an advertising unit in the single environment.

Embodiments of the invention can also include a system and method for generating, reviewing, editing, and transmitting a rich media advertising unit in a single environment.

Other systems and methods according to various embodiments of the invention will become apparent with respect to the remainder of this document.

DETAILED DESCRIPTION OF EMBODIMENTS

As used herein, an "advertising unit" or "ad unit" means an electronic advertisement that can be viewed using a computer display or other display device in communication with a processor or a network. Examples of advertising units can include, but are not limited to, banner ads, floating ads, expanding ads, pop-ups, pop-unders, and videos.

As used herein, the term "Flash" relates to the use of Adobe Flash 8, Adobe Flash 9, or any other Flash-type product utilizing ActionScript or a similar scripting or other programming language. Suitable examples of Flash are provided by Macromedia or Adobe Systems.

As used herein, the term "Silverlight" relates to the use of Microsoft Silverlight, or any other Silverlight-type product utilizing a scripting or other programming language. Suitable examples of Silverlight are provided by Microsoft Corporation.

As used herein, the term "single environment" means an environment in which a user can generate, review, edit, and transmit an advertising unit to another user by way of a single application program, and other users can modify, review, edit, and transfer the same advertising unit using the same application program. Examples of suitable single environments can be an Adobe Flash environment and a Microsoft Silverlight environment.

As used herein, the terms "transmitting" and "transferring" are used interchangeably.

Figure 1:
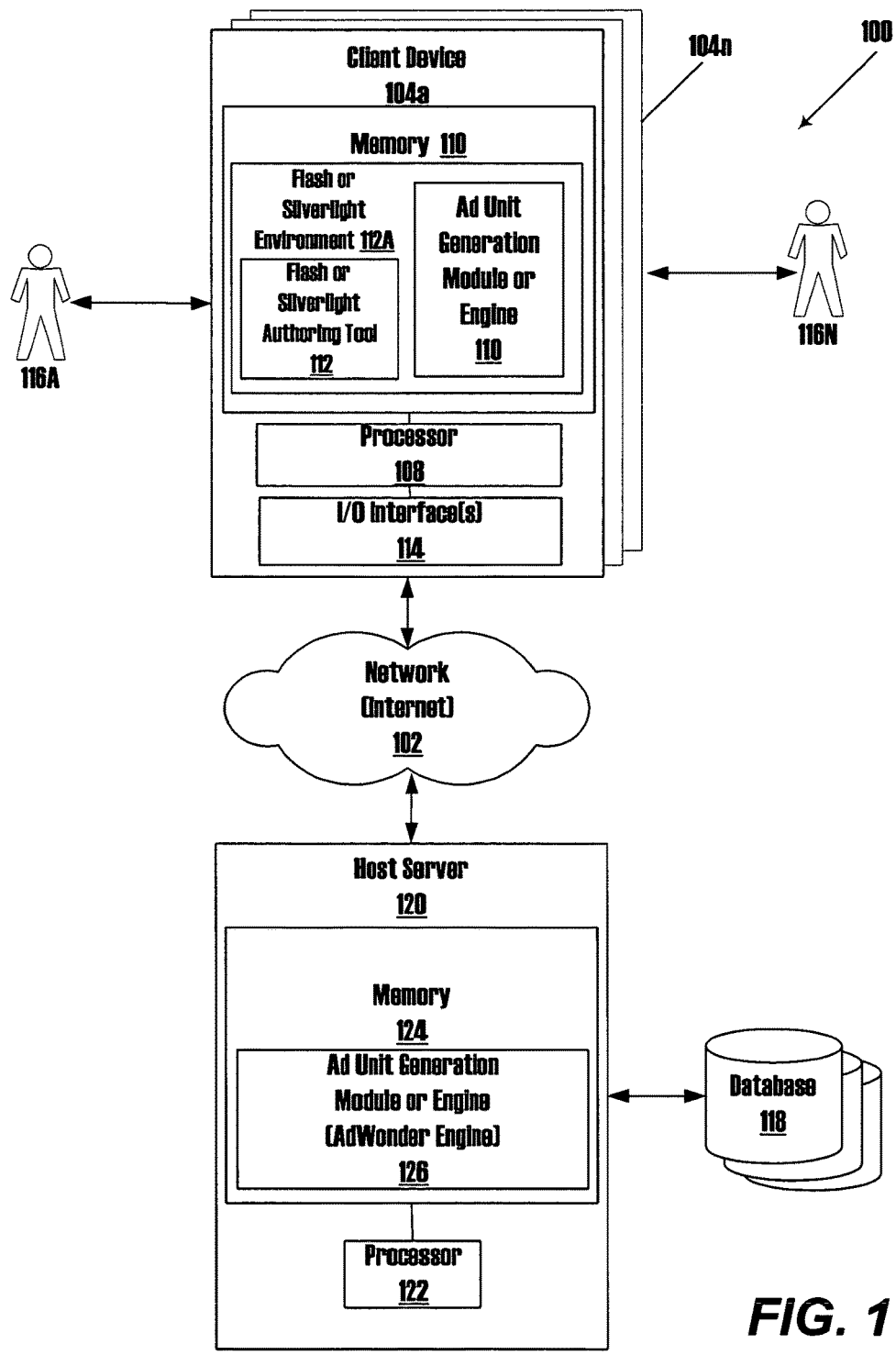
FIG. 1 is an illustration of an example system according to one embodiment of the invention.

Embodiments of the invention relate to systems and methods for generating, reviewing, editing, and transmitting an advertising unit in a single environment. Embodiments can also generate rich media advertising units and videos in a single environment. Embodiments can also create tracking capabilities for an advertising unit and/or a rich media advertising unit. An example environment and system in accordance with an embodiment of the invention are shown in FIG. 1. FIG. 1 illustrates an example environment for an example system 100 in accordance with various embodiments of the invention. In the example shown, the environment can be a networked computer environment.

FIG. 1 illustrates an example system 100 for generating, reviewing, editing, and transmitting advertising units within a single environment according to one embodiment of the invention. The system 100 is shown with a communications network 102 in communication with at least one client device 104a. Any number of other client devices 104n can also be in communication with the network 102. In this embodiment, at least one of the client devices 104a-n can be associated with a user.

The communications network 102 shown in FIG. 1 can be any communications network capable of transmitting both audio and data signals, including image data signals or multimedia signals. Such communications networks may include any combination of optical networks, telephone lines, DSL, cable networks, T1 lines, T3 lines, DS3 lines, wireless network connections, or any other configuration that provides for the transmission and reception of network signals. Other types of communications networks can be used in accordance with various embodiments of the invention. The network 102 may implement any number of communication protocols, including TCP/IP (Transmission Control Protocols/Internet Protocol). The network 102 may also implement any number of protocol overlay technologies including MPLS (Multi-Protocol Label Switching).

Each client device 104a-n can be a computer or processor-based device capable of communicating with the communications network 102 via a signal, such as a wireless frequency signal or a direct wired communication signal. Each client device, such as 104a, can include a processor 106 and a computer-readable medium, such as a random access memory (RAM) 108, coupled to the processor 106. The processor 106 can execute computer-executable program instructions stored in memory 108. Computer executable program instructions stored in memory 108 can include an advertisement generation application program, such as an ad unit component module or engine 110 or ad unit component module program. One example of an ad unit component module or engine is the AdWonder™ Flash Component application program which is distributed by EyeWonder, Inc. of Atlanta, Ga. The ad unit component module or engine 110 can be adapted to implement a method for generating, reviewing, editing, and transferring an advertising unit, such as a rich media advertising unit or video, in a single environment, such as a Flash or Silverlight environment. In addition, an ad unit component module or engine 110 can be adapted to receive one or more signals from one or more users 116A-N and/or other client devices 104n. Other examples of functionality and aspects of embodiments of an ad unit component module or engine 110 are described below.

One embodiment of an ad unit component module or engine can include a main application program process with multiple threads. Another embodiment of an ad unit component module or engine can include different programming threads or functional modules. One example of a programming thread or functional module can include an authoring tool program such as a Flash or Silverlight authoring tool 112, for example, Adobe Flash 8, Adobe Flash 9, Microsoft Silverlight or another Flash-type product utilizing ActionScript or another scripting language. Another example of a programming thread or functional module can be a module for communicating with a user. Another programming thread or functional module can be a module for communicating with a customer system such as a customer client device. Yet another programming thread or functional module can provide communications and exchange of data between a user and customer system or customer client device. One other programming thread or functional module can provide database management functionality, including storing, searching, and retrieving data, information, or data records from a combination of databases, data storage devices, and one or more associated servers.

In one embodiment, an ad unit component module or engine, such as 110, can facilitate generating, reviewing, editing, and transferring an advertising unit in a single environment. In this embodiment, the ad unit component module or engine 110 can plug-in into or otherwise operate in conjunction with an authoring tool program such as a Flash or Silverlight authoring tool 112, for example, Adobe Flash 8, Adobe Flash 9, or Microsoft Silverlight, to facilitate user generation, review, editing, and transfer of one or more advertising units in a single environment. As shown in FIG. 1, an ad unit component module or engine 110 can communicate with or otherwise interact with an authoring tool program, such as a Flash or Silverlight authoring tool 112, as needed to facilitate some or all functionality within a single environment. For example in one embodiment, an ad unit component module or engine 110 can be packaged as an single extensions file "AdWonder.mxp" that installs itself on an associated client device, such as 104a, when a user such as 116A executes the file. To facilitate execution of the file, a suitable Flash or Silverlight authoring tool 112 such as Adobe Flash 8 is simultaneously executed on the client device 104a. When both the ad unit component module or engine 110 and Flash or Silverlight authoring tool 112 are executed, the ad unit component module or engine 110 can suitably adapt to or otherwise operate with the Flash or Silverlight authoring tool 112 to provide additional functionality. For instance, the ad unit component module or engine 110 can provide one or more tools or creative application program tools for use by one or more users within the single environment, such as a Flash environment.

Using the ad unit component module or engine 110, a user could, for example, transfer one or more advertising units to another user to generate, review, edit, and transfer back modified and/or original advertising units using the same authoring tool program and within a single environment, such as a Flash or Silverlight environment 112A. In at least one embodiment, to facilitate transfer of an advertising unit, an ad unit component module or engine such as 110 can include or otherwise operate in conjunction with a Java-based service module adapted to compress and transmit one or more files associated with an advertising unit. For instance, the Java-based service module can communicate with the ad unit component module or engine 110 via one or more TCP/IP ports, and any number of files comprising an advertising unit can be compressed by the Java-based service module for transmission via a network, such as 102, to a server, such as 120. Another user, such as 116N, may access or otherwise receive some or all of the compressed files associated with the advertising unit via the server 120, and using a Java environment, such as a Java Runtime Environment provided by Sun Microsystems. The user 116N may execute or otherwise access some or all of the files comprising the advertising unit on a client device, such as 104n, for use with an ad unit component module or engine or authoring tool program.

In the above manner, multiple users can generate, review, edit, and transfer the same advertising unit in a single environment, such as 112A, and none of the users would have to use other application programs, such as Microsoft Word, Microsoft Outlook, or other authoring tools or communication tools, to generate, review, edit, and transfer the advertising unit.

Suitable processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 106, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, PHP, ActionScript and JavaScript.

Client devices 104a-n may also comprise a number of external or internal devices such as a mouse, a CD-ROM, DVD, a keyboard, a display, or other input or output devices. As shown in FIG. 1, a client device such as 104a can be in communication with an output device via an I/O interface, such as 114. Examples of client devices 104a-n are personal computers, mobile computers, handheld portable computers, digital assistants, personal digital assistants, cellular phones, mobile phones, smart phones, pagers, digital tablets, desktop computers, laptop computers, Internet appliances, and other processor-based devices. In general, a client device, such as 104a, may be any type of processor-based platform that is connected to a network, such as 102, and that interacts with one or more application programs. Client devices 104a-n may operate on any operating system capable of supporting a browser or browser-enabled application, such as Microsoft® Windows® or Linux. The client devices 104a-n shown include, for example, personal computers executing a browser application program such as Microsoft Corporation's Internet Explorer™, Netscape Communication Corporation's Netscape Navigator™, Mozilla Firefox™, and Apple Computer, Inc.'s Safari™.

A user, such as 116A, can interact with a client device, such as 104a, via an input device (not shown) such as a keyboard or a mouse. For example, a user 116A can input information, such as rich media ad data associated with an ad or video product, other ad or video product-related information, or information associated with ads or videos, via the client device 104a. Another user, such as 116N, can interact with another client device, such as 104n, via another input device (not shown) to input information such as rich media ad data. In this manner, both users 116A, 116N can review, edit, and transfer the same advertising unit within the same or single environment.

Memory, such as 110 in FIG. 1 and described above, or another data storage device, such as 118 described below, can store information associated with an ad or video product for subsequent retrieval. In this manner, the system 100 can store ad or video product specification and reliability information in memory 108 associated with a client device, such as 104a or a desktop computer, or a database 118 in communication with a client device 104a or a desktop computer, and a network, such as 102.

The memory 108 and database 118 can be in communication with any number of other databases, such as a centralized database, or other types of data storage devices. When needed, data stored in the memory 108 or database 118 may be transmitted to a centralized database capable of receiving data, information, or data records from more than one database or other data storage devices.

The system 100 can display an ad or video product and rich media ad-related information via an output device associated with a client device. In one embodiment, ad or video product specification and reliability information can be displayed on an output device, such as a display, associated with a remotely located client device, such as 104a. Suitable types of output devices can include, but are not limited to, private-type displays, public-type displays, plasma displays, LCD displays, touch screen devices, and projector displays on cinema-type screens.

The system 100 can also include a server 120 in communication with the network 102. In one embodiment, the server 120 can be in communication with a public switched telephone network. Similar to the client devices 104a-n, the server device 120 shown comprises a processor 122 coupled to a computer-readable memory 124. In the embodiment shown, ad authoring module 126 or engine can be stored in memory 124 associated with the server 120. The server device 120 can be in communication with a database, such as 118, or other data storage device. The database 118 can receive and store data from the server 120, or from a client device, such as 104a, via the network 102. Data stored in the database 118 can be retrieved by the server 120 or client devices 104a-n as needed.

The server 120 can transmit and receive information to and from multiple sources via the network 102, including a client device such as 104a, and a database such as 118 or other data storage device.

Server device 120, depicted as a single computer system, may be implemented as a network of computer processors. Examples of suitable server device 120 are servers, mainframe computers, networked computers, a processor-based device, and similar types of systems and devices. Client processor 106 and the server processor 122 can be any of a number of computer processors, such as processors from Intel Corporation of Santa Clara, Calif. and Motorola Corporation of Schaumburg, Ill. The computational tasks associated with rendering a graphical image could be performed on the server device(s) and/or some or all of the client device(s).

The server processor 122 and a computer-readable medium, such as a random access memory (RAM) 124, coupled to the processor 122, can execute computer-executable program instructions stored in memory 124. Computer executable program instructions stored in memory 124 can include an advertisement generation application program, such as an ad unit component module or engine 126. One example of an ad unit component module or engine, similar to 110 above, is the AdWonder™ Flash Component application program which is distributed by EyeWonder, Inc. of Atlanta, Ga. The ad unit component module or engine 126, similar to 110, can be adapted to implement a method for generating, reviewing, editing, and transferring an advertising unit, such as a rich media advertising unit or video, in a single environment, such as a Flash environment or Silverlight environment. In addition, an ad unit component module or engine 126 can be adapted to receive one or more signals from one or more users 116A-N and/or other client devices 104n. Other examples of functionality and aspects of embodiments of an ad unit component module or engine 126 are described above with respect to 110.

The configuration and arrangement of the components shown and described with respect to FIG. 1 are shown by way of example only, and other configurations and arrangements of system components can exist in accordance with other embodiments of the invention.

Figure 2:
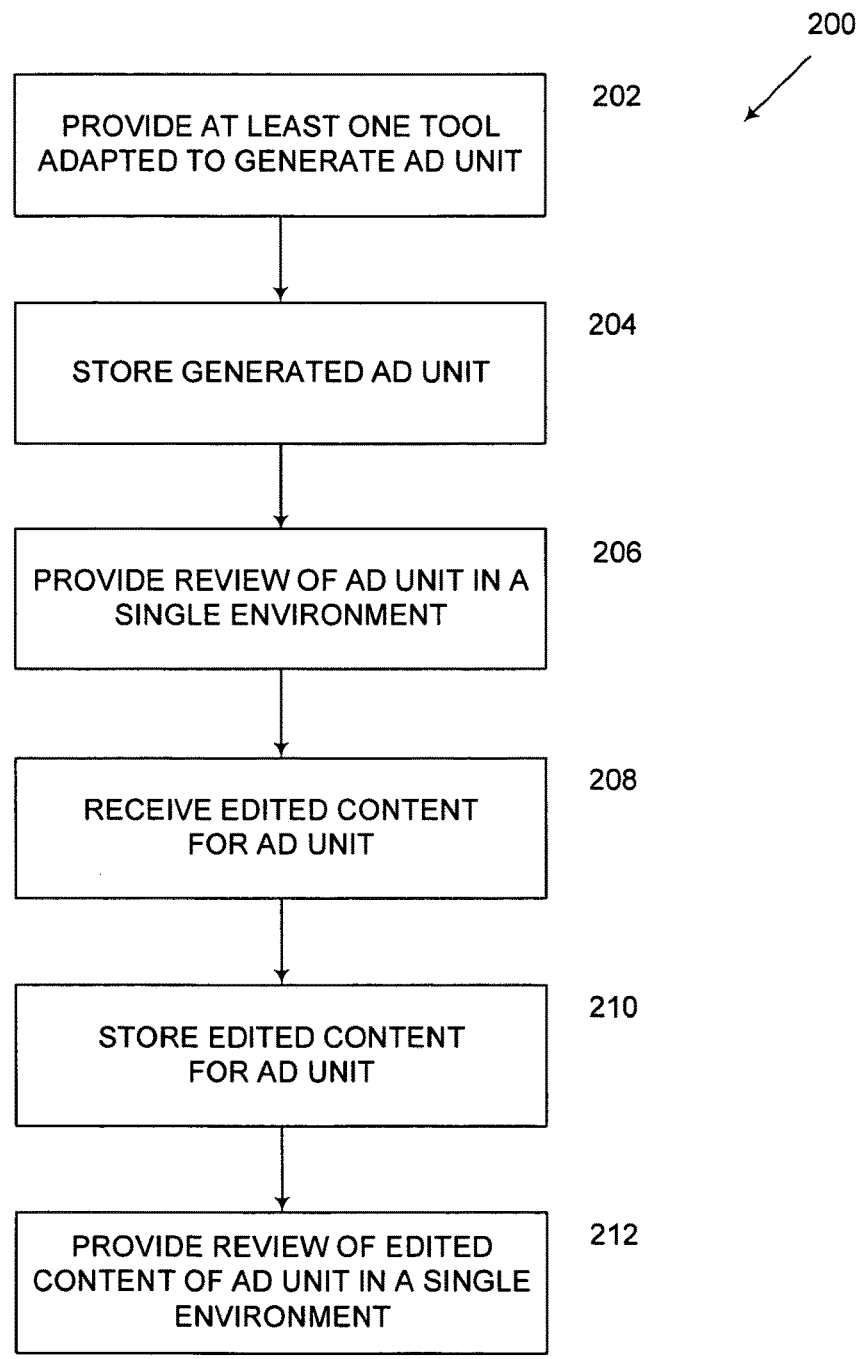
FIG. 2 is a flowchart for an example method according to one embodiment of the invention.

Using the example system 100 illustrated in FIG. 1, the example method 200 described in FIG. 2 can be implemented. FIG. 2 illustrates an example method for generating, reviewing, editing, and transferring an advertising unit in a single environment, such as a Flash environment or Silverlight environment. The method 200 of FIG. 2 begins at block 202.

In block 202, at least one tool adapted to generate an advertising unit is provided. In this embodiment, an ad unit component module or engine, such as 110 in FIG. 1, can provide at least one tool adapted to generate an advertising unit. A tool can include, but is not limited to, a creative application program tool, drag and drop-type functionality, a drag and drop component library, an event, a command, a template, a testing component, a control button, and a method and/or code hint. Other tools can exist with other embodiments of the invention.

In another embodiment, an ad unit component module or engine 110 can provide drag and drop-type functionality or tools to be adapted to a components panel in a Flash or Silverlight authoring tool 112, such as Adobe Flash 8, or Microsoft Silverlight. A user, for instance 116A, can drag and/or drop one or more components to an advertising unit of interest to generate multiple video screens, video buttons, and testing functionality.

In yet another embodiment, drag and drop-type functionality can include, but are not limited to, components such as audio on, audio off, audio slider, audio toggle, clickthru, façade, fast forward, pause, play, progress bar, replay, rewind, stop, video screen, and video toggle.

In another embodiment event-type functionality can include, but is not limited to, setting a time-based video event, setting a user action-based event such as when a user rolls out of an ad layer, and setting a video event such as when a predetermined video characteristic is detected.

In another embodiment, command-type functionality can include, but is not limited to, a standard task, creating an expandable ad, adding video, and any command function which can be performed after an ad unit has been started.

In another embodiment, template-type functionality can include, but is not limited to, a predetermined size for an ad unit, a predetermined format for an ad unit, a banner template, and an expandable template.

In another embodiment, testing component-type functionality can include, but is not limited to, testing an ad unit, and inserting one or more clicktags and/or clicktagvalues for clickthrus associated with an ad unit.

In another embodiment, an ad unit component module or engine 110 can provide methods and code hints functionality or tools to be adapted to an ActionScript panel in a Flash or Silverlight authoring tool 112 such as Adobe Flash 8 or Microsoft Silverlight. A user, for instance 116A, could type "EW." within an ActionScript panel, which can prompt any number of standard Eyewonder methods. In one example, a user 116A can prompt video specific functionality by typing "EW.Video" within the Action Script panel, and a list of video functionality can be provided for selection. Other methods can be loaded within each respective component set within the ActionScript panel, and can be called by the user 116A using an appropriate command such as "EW.Command".

In yet another embodiment, methods and code hints functionality can include, but are not limited to, EW.clickthru, EW.close, EW.contract, EW.expand, EW.loadChildSwf, EW.open, EW.sendToPanel, EW.trackInteraction, EW.trackEvent, EW.unloadChildSwf, EW.download, EW.loadContent, EW.loadSound, EW.onRollOff, EW.onClickThru, EW.Video.addEventListener, EW.Video.stopAll, EW.Video.registerButton, and EW.Video.getView.

Block 202 is followed by block 204, in which an advertising unit is stored. In this embodiment, the ad unit component module or engine 110 can receive ad content generated by a user using the at least one tool adapted to generate an advertising unit. The ad unit component module or engine 110 can store the ad content as an advertising unit in a data storage device, such as a memory or database. Examples of data storage device can include, but are not limited to, memory 108, memory 124, database 118, or a similar type of data storage device associated with a client device 104a-n, or server 120.

Block 204 is followed by block 206, in which a review of the advertising unit is provided in a single environment. In this embodiment, the ad unit component module or engine 110 can provide a review of the advertising unit in a single environment, such as a Flash environment or Silverlight environment, wherein a user can observe the advertising unit in the single environment. For example, a suitable single environment can be a Flash environment, which is an environment for executing a creative application program which permits one user to generate an advertising unit in a particular format, and further permits another user to review and edit the advertising unit in the same format without having to use other application programs, such as Microsoft Word or Microsoft Outlook, to edit, review, or transmit the advertising unit. Examples of suitable creative application programs can include, but are not limited to, Adobe Flash 8, Adobe Flash 9, and Microsoft Silverlight.

Block 206 is followed by block 208, in which edited content for the advertising unit is received. In this embodiment, the ad unit component module or engine 110 can receive one more modifications to the advertising unit, such as new content or edits. In one example, an ad unit component module or engine such as 110 can facilitate, within a single environment, receiving one or more edits to a particular advertising unit from one or more users, such as a 116A and 116N.

Block 208 is followed by block 210, in which edited content for the advertising unit is stored. In this embodiment, the ad unit component module or engine 110 can store one or more modifications to the advertising unit, such newly received content or edits. In one example, edits to a particular advertising unit can be stored in memory such as 108, or in a database such as 118, or a similar type of data storage device associated with a client device 104a-n.

Block 210 is followed by block 212, in which a review of edited content of the advertising unit can be provided in a single environment. In this embodiment, the ad unit component module or engine 110 can provide a review of the advertising unit in a single environment, such as a Flash environment or Silverlight environment, wherein a user can observe the edited content of the advertising unit in the single environment. As explained above, a suitable single environment can be a Flash or Silverlight environment, which is an environment for executing a creative application program which permits one user to generate an advertising unit in a particular format, and further permits another user to review and edit the advertising unit in the same format without having to use other application programs, such as Microsoft Word or Microsoft Outlook, to edit, review, or transmit the advertising unit. Examples of suitable creative application programs can include, but are not limited to, Adobe Flash 8, Adobe Flash 9, and Microsoft Silverlight.

The method 200 ends at block 212.

Figure 3:
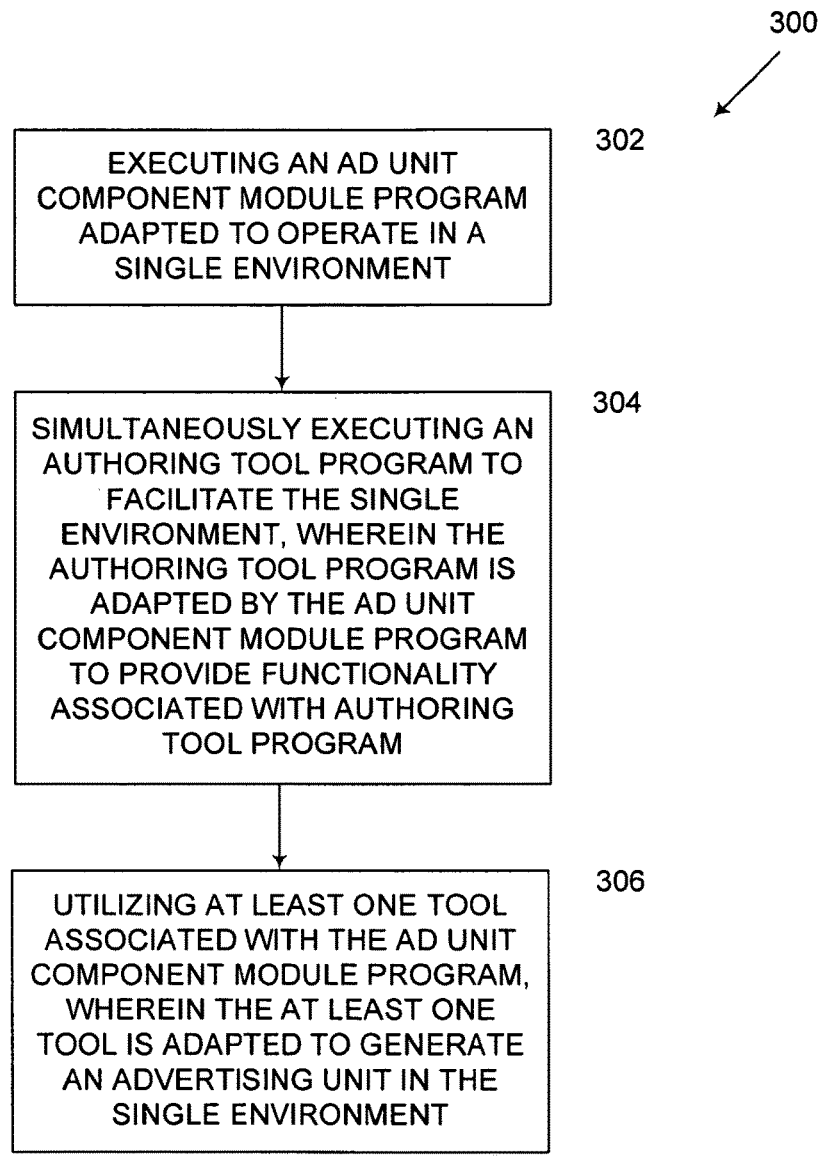
FIG. 3 is a flowchart for another example method according to one embodiment of the invention.

Using the example system 100 illustrated in FIG. 1, the example method 300 described in FIG. 3 can be implemented. FIG. 3 illustrates an example method for generating an advertising unit in a single environment, such as a Flash or Silverlight environment. The method 300 of FIG. 3 begins at block 302.

In block 302, an ad unit component module program adapted to operate in a single environment is executed. In the embodiment shown, an ad unit component module program or ad unit component module or engine such as 110 in FIG. 1 can be executed.

In one aspect, the single environment can include an Adobe Flash environment or a Microsoft Silverlight environment.

Block 302 is followed by block 304, in which an authoring tool program to facilitate the single environment is simultaneously executed, wherein the authoring tool program is adapted by the ad unit component module program to provide functionality associated with authoring tool program. In the embodiment shown, an ad authoring tool such as a Flash authoring tool 112 in FIG. 1 can be simultaneously executed.

In one aspect, the authoring tool program can include at least one of the following: Adobe Flash 8, Adobe Flash 9, Microsoft Silverlight, or another Flash-type product utilizing ActionScript or another scripting language.

In another aspect, an ad unit component module or engine 110 can provide drag and drop-type functionality or tools to be adapted to a components panel in a Flash or Silverlight authoring tool 112 such as Adobe Flash 8 or Microsoft Silverlight. A user, for instance 116A, can drag and/or drop one or more components to an advertising unit of interest to generate multiple video screens, video buttons, and testing functionality.

In yet another aspect, drag and drop-type functionality can include, but are not limited to, components such as audio on, audio off, audio slider, audio toggle, clickthru, façade, fast forward, pause, play, progress bar, replay, rewind, stop, video screen, and video toggle.

In another aspect, an ad unit component module or engine 110 can provide methods and code hints functionality or tools to be adapted to an ActionScript panel in a Flash or Silverlight authoring tool 112 such as Adobe Flash 8 or Microsoft Silverlight. A user, for instance 116A, could type "EW." within an ActionScript panel, which can prompt any number of standard Eyewonder methods. In one example, a user 116A can prompt video specific functionality by typing "EW.Video" within the Action Script panel, and a list of video functionality can be provided for selection. Other methods can be loaded within each respective component set within the ActionScript panel, and can be called by the user 116A using an appropriate command such as "EW.Command".

In yet another aspect, methods and code hints functionality can include, but are not limited to, EW.clickthru, EW.close, EW.contract, EW.expand, EW.loadChildSwf, EW.open, EW.sendToPanel, EW.trackInteraction, EW.trackEvent, EW.unloadChildSwf, EW.download, EW.loadContent, EW.loadSound, EW.onRollOff, EW.onClickThru, EW.Video.addEventListener, EW.Video.stopAll, EW.Video.registerButton, and EW.Video.getView.

Block 304 is followed by block 306, in which at least one tool associated with the ad unit component module program is utilized, wherein the at least one tool is adapted to generate an advertising unit in the single environment. In the embodiment shown, a tool such as an editing tool illustrated in FIG. 7 can be used to generate an advertising unit in the single environment.

In one aspect, the at least one tool can include a creative application program tool.

In one aspect, the method 300 can further include within the single environment, receiving edited content for the advertising unit from another user, wherein the edited content is adapted to modify the original advertising unit.

In one aspect, the method can further include within the single environment, transferring one or more files associated with the advertising unit to the at least one user.

The method 300 ends at block 306.

Figure 4:
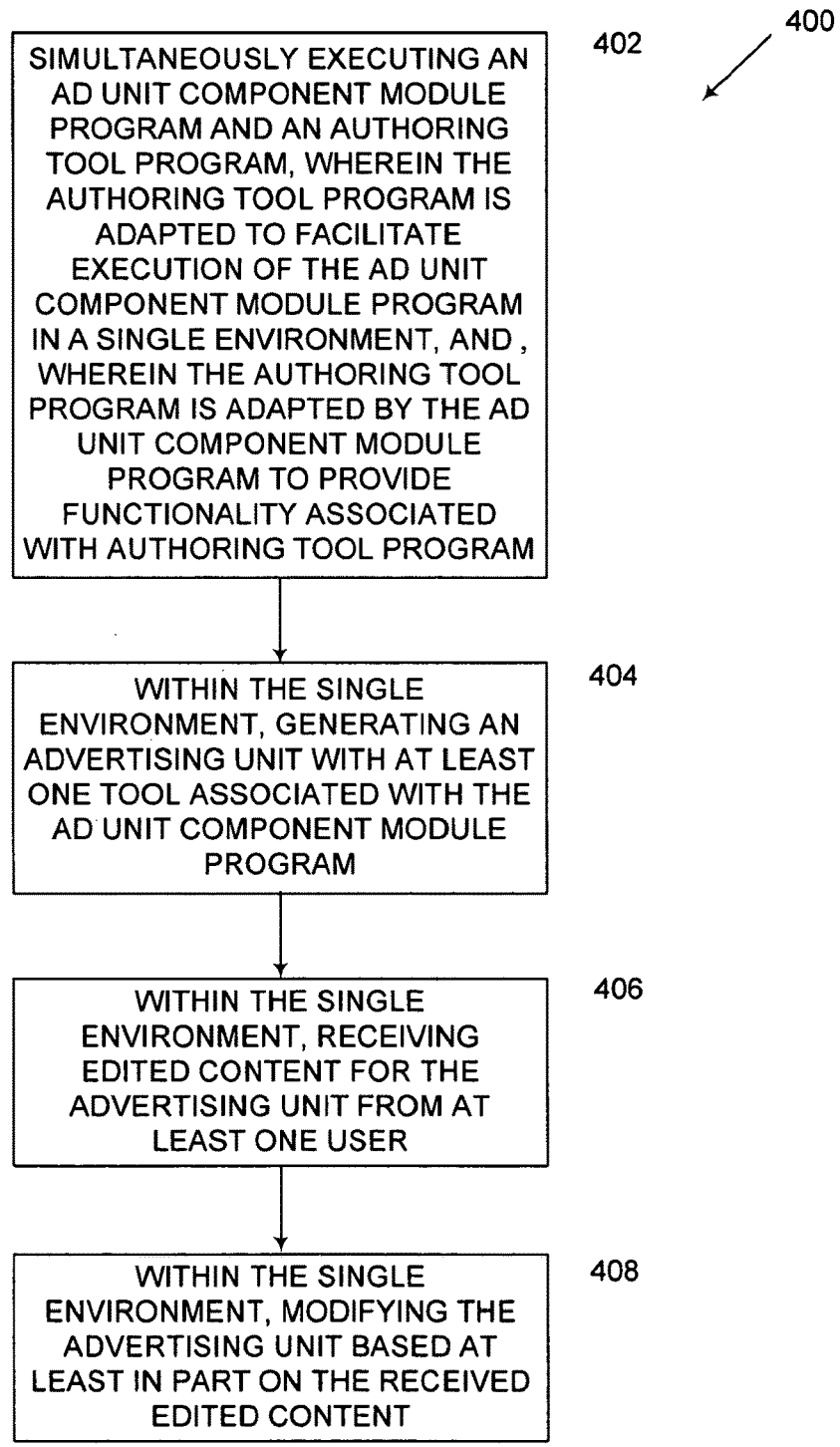
FIG. 4 is a flowchart for another example method according to one embodiment of the invention.

Using the example system 100 illustrated in FIG. 1, the example method 400 described in FIG. 4 can be implemented. FIG. 4 illustrates an example method for manipulating an advertising unit in a single environment, such as a Flash or Silverlight environment. The method 400 of FIG. 4 begins at block 402.

In block 402, an ad unit component module program and an authoring tool program are simultaneously executed, wherein the authoring tool program is adapted to facilitate execution of the ad unit component module program in a single environment, and wherein the authoring tool program is adapted by the ad unit component module program to provide functionality associated with authoring tool program. In the embodiment shown, an ad unit component module program or ad unit component module or engine such as 110 in FIG. 1, and an ad authoring tool such as a Flash or Silverlight authoring tool 112 in FIG. 1 can be simultaneously executed.

In one aspect, the single environment can include an Adobe Flash environment, or a Microsoft Silverlight environment.

In one aspect, the authoring tool program can include at least one of the following: Adobe Flash 8, Adobe Flash 9, Microsoft Silverlight, or another Flash-type product utilizing ActionScript or another scripting language.

Block 402 is followed by block 404, in which within the single environment, an advertising unit with at least one tool associated with the ad unit component module program is generated. In the embodiment shown, a tool such as a creative tool illustrated in FIG. 7 can be used to generate an advertising unit in the single environment.

In one aspect, the at least one tool can include a creative application program tool.

Block 404 is followed by block 406, in which in within the single environment, edited content for the advertising unit from at least one user is received. In the embodiment shown, edited content for an advertising unit from a user such as 116N in FIG. 1 can be received.

Block 406 is followed by block 408, in which within the single environment, the advertising unit is modified based at least in part on the received edited content. In the embodiment shown, the ad unit component module, such as 110 in FIG. 1, can modify the advertising unit based at least in part on the received edited content.

In one aspect, the method 400 can include storing the advertising unit.

In another aspect, the method 400 can further include within the single environment, transferring one or more files associated with the advertising unit to the at least one user.

The methods disclosed herein are by way of example only, and other methods in accordance with embodiments of the invention can include other elements or steps, including fewer or greater numbers of element or steps than the example methods described herein as well as various combinations of these or other elements.

FIGS. 5-12 illustrate example screenshots for a system in accordance with an embodiment of the invention. The example screenshots shown in FIGS. 5-12 can be used with a system, shown as 100 in FIG. 1, and methods, shown as 200, 300, 400 in FIGS. 2-4 respectively, for generating, reviewing, editing, and transferring an advertising unit in a single environment, such as a Flash environment or Silverlight environment. In these example screenshots, one embodiment of a user interface for use with the system 100 and methods 200, 300, 400 is shown. Other examples of screenshots, and configurations for screenshots can exist with other embodiments of the invention.

Figure 5:
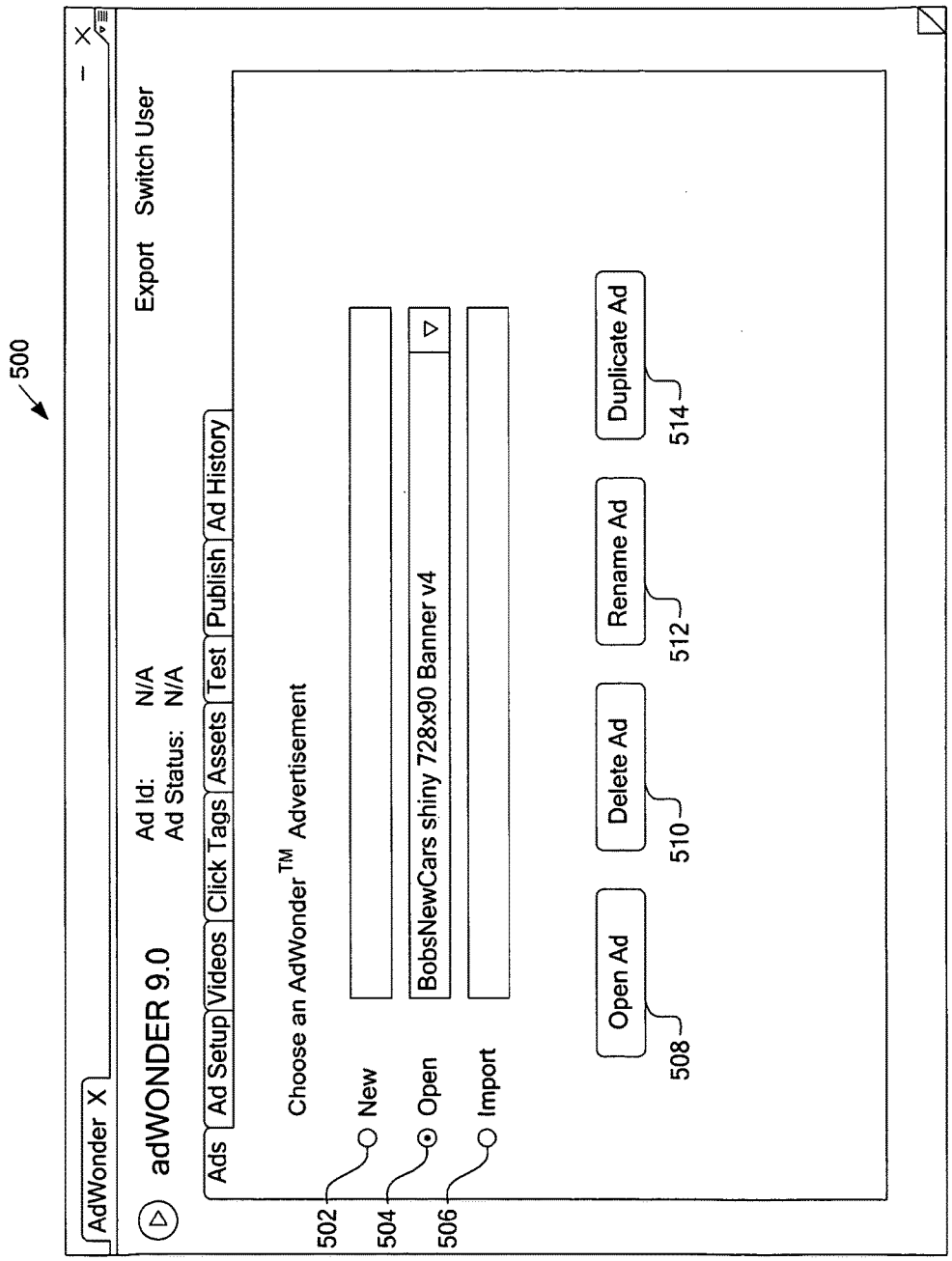
FIGS. 5-12 are example screenshots for a system and method according to one embodiment of the invention.

FIG. 5 is an example screenshot for selecting an advertising unit for generation or further editing using one or more creative application program tools in accordance with an embodiment of the invention. In this embodiment, a user interface 500 provides one or more options to select a particular advertising unit for editing or modification. For example, respective radio buttons can be provided for a user to select a particular advertising unit, such as generating a new advertising unit 502, editing or opening an existing advertising unit 504, or editing or importing an existing advertising unit 506. Other commands, such as open an ad 508, delete an ad 510, rename an ad 512, and duplicate ad 514 can be provided via a series of command buttons. Other examples of commands to select a particular advertising unit for editing or modification, and configurations for such commands can exist in other embodiments of the invention.

Figure 6:
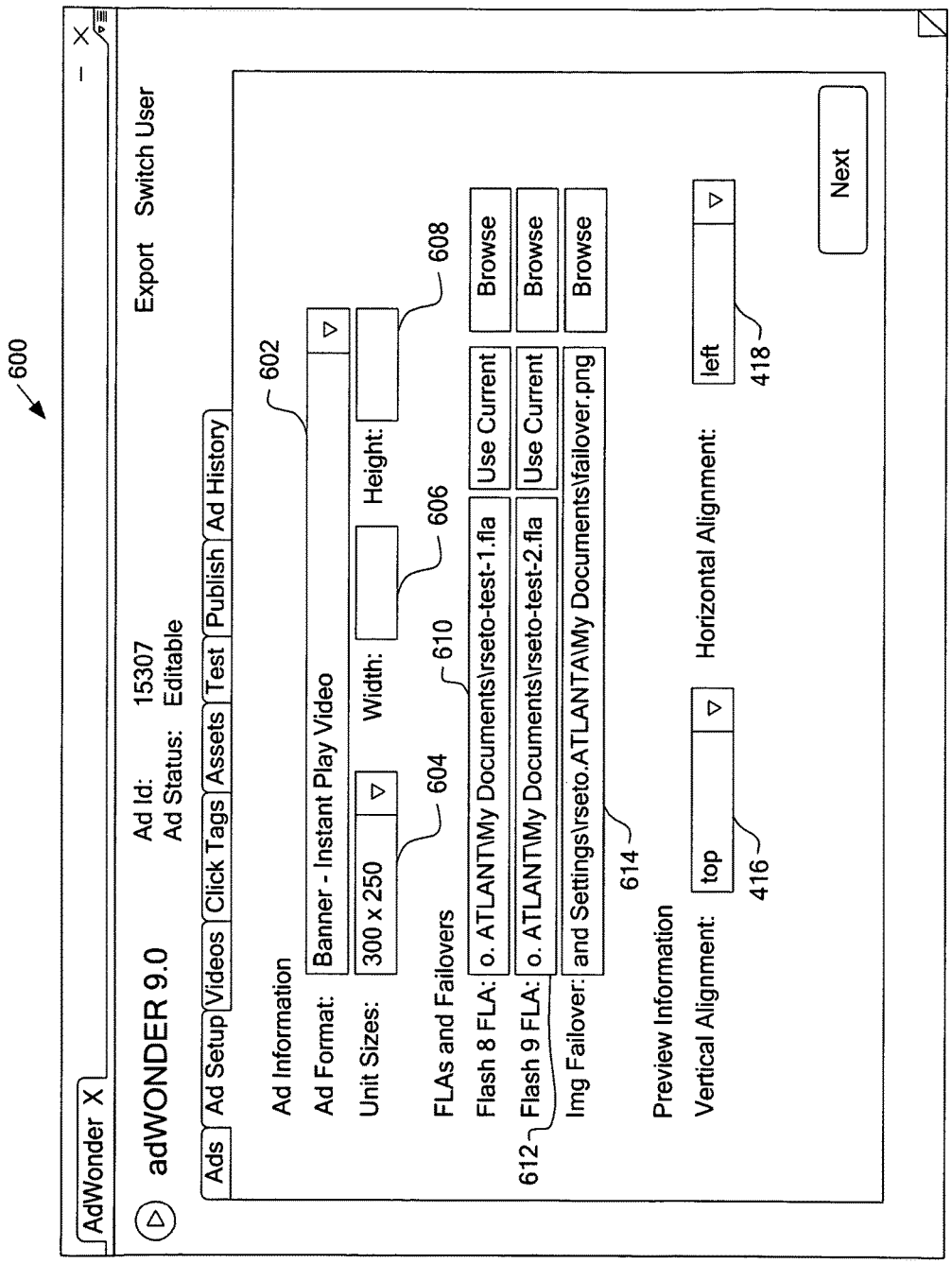

FIG. 6 is an example screenshot for setting up an advertising unit using one or more creative tools, such as selecting a format for an advertising unit, in accordance with an embodiment of the invention. In this embodiment, a user interface 600 provides one or more options to select a format for a particular advertising unit. For example, respective pull down menus or fields can be provided for a user to select a format for a particular advertising unit, such as a predefined ad format 602, an advertising unit size 604, a custom width 606 or height 608 for an advertising unit size, a Flash 8 file (FLA) directory 610, a Flash 9 file (FLA) directory 612, an image (IMG) failover 614, vertical alignment preview information 616, and horizontal alignment preview information 618. Other examples of menus and commands to select a format for a particular advertising unit for editing or modification, and configurations for such menus and commands can exist in other embodiments of the invention.

In one embodiment, a particular Flash 8 file (FLA) or Flash 9 file (FLA) can be selected by a user, via fields 610 or 612, to display a particular advertising unit with maximum compatibility. In another embodiment, a particular image failover can be selected by a user, via field 614, if a reviewing user does not have a particular Flash version installed to suitably view a particular advertising unit.

Figure 7:
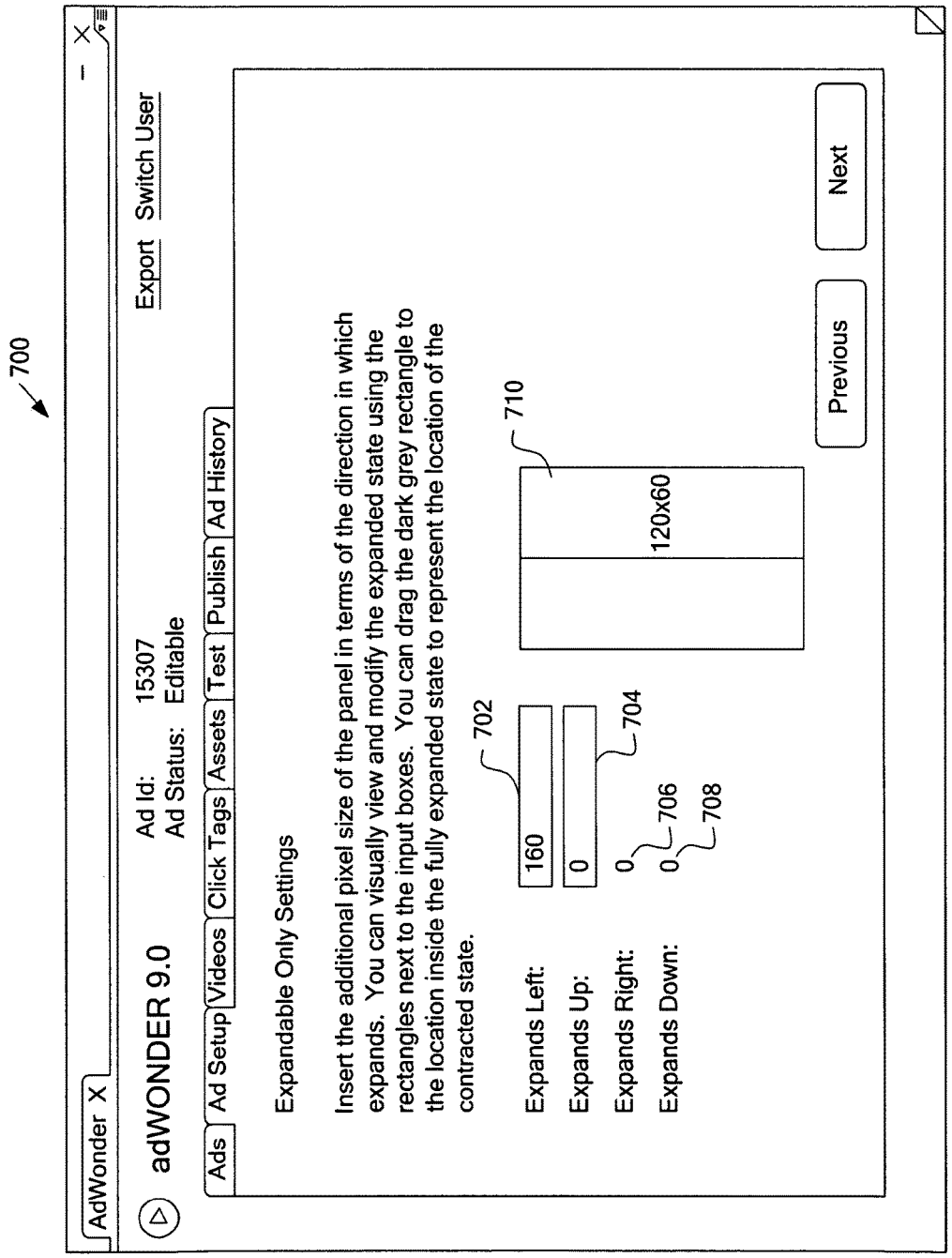

FIG. 7 is an example screenshot for setting up an advertising unit using one or more creative tools, such as selecting one or more expandable only settings for an advertising unit, in accordance with an embodiment of the invention. In this embodiment, a user interface 700 provides one or more options to select a number of pixels to expand a particular advertising unit when the unit is expanded by a user. For example, respective fields can be provided for a user to select a number of pixels to expand a particular advertising unit, such as left side expansion 702, upward expansion 704, right side expansion 706, and downward expansion 708. A graphic, such as 710, can illustrate a sample size of the original advertising unit size and expanded size of the advertising unit. Other examples of fields or commands to select a number of pixels to expand a particular advertising unit, and configurations for such fields and commands can exist in other embodiments of the invention.

In one embodiment, a user can select any number of pixels to expand any side of a particular advertising unit, including the left side, top or upper (upward) side, right side, and bottom or lower (downward) side.

Figure 8:
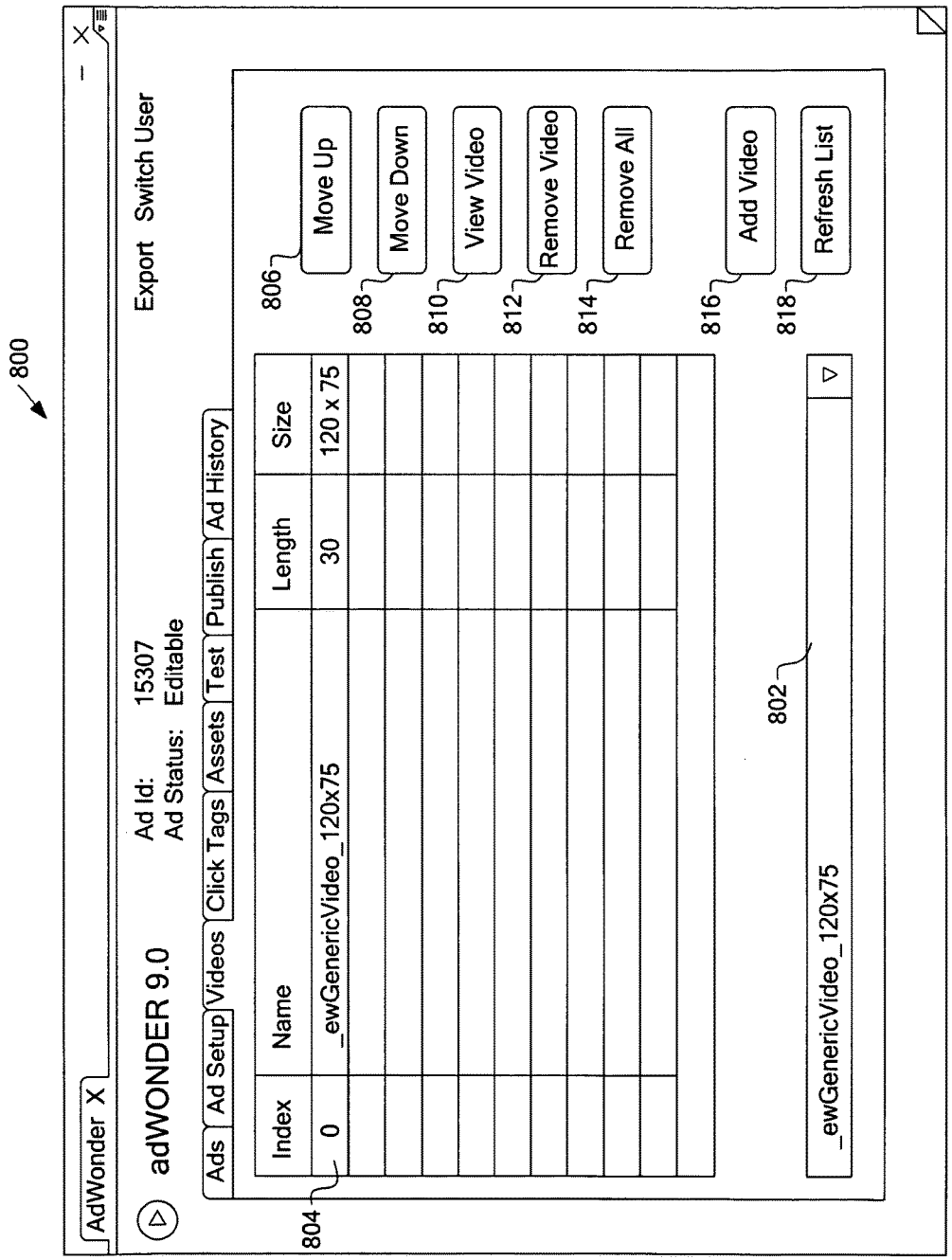

FIG. 8 is an example screenshot for selecting a video for an advertising unit using one or more creative application program tools in accordance with an embodiment of the invention. In this embodiment, a user interface 800 provides one or more options to select a video for a particular advertising unit. For example, a pull down list 802 of previously encoded or transferred videos can be provided for a user to select a particular video for an advertising unit. In the example shown, a previously encoded or transferred video, such as "_ewGenericWideo_120x75" 804, can be selected by a user. Additional videos can be selected by a user when such videos are available for selection in the upper field 806. Within the upper field 806, certain characteristics associated with each video can be displayed, such as a length and size of each video. In one embodiment, additional videos for selection can be associated with a user account, or can be videos that have been previously encoded, uploaded, and associated with a user account or particular user. In this example, such videos can be stored on a server, such as 120 in FIG. 1, or database associated with a server, such as database 118. Other commands can permit a user to navigate through and select from the list of videos in the upper field 806. In this example, such commands can include move up 808, move down 810, view video 812, remove video 814, remove all 816, add video 818, and refresh list 820. Other examples of fields or commands to select a video for an advertising unit, and configurations for such fields and commands can exist in other embodiments of the invention.

In one embodiment, a user can select multiple videos for an advertising unit. In the user selection, the user can indicate a particular order for the display of the videos in the advertising unit.

In one embodiment, user selection of the view video command 812 permits a user to review and observe a particular video. In this instance, a new window may appear on the user's output device or display, and the selected video can be played within the new window.

Figure 9:
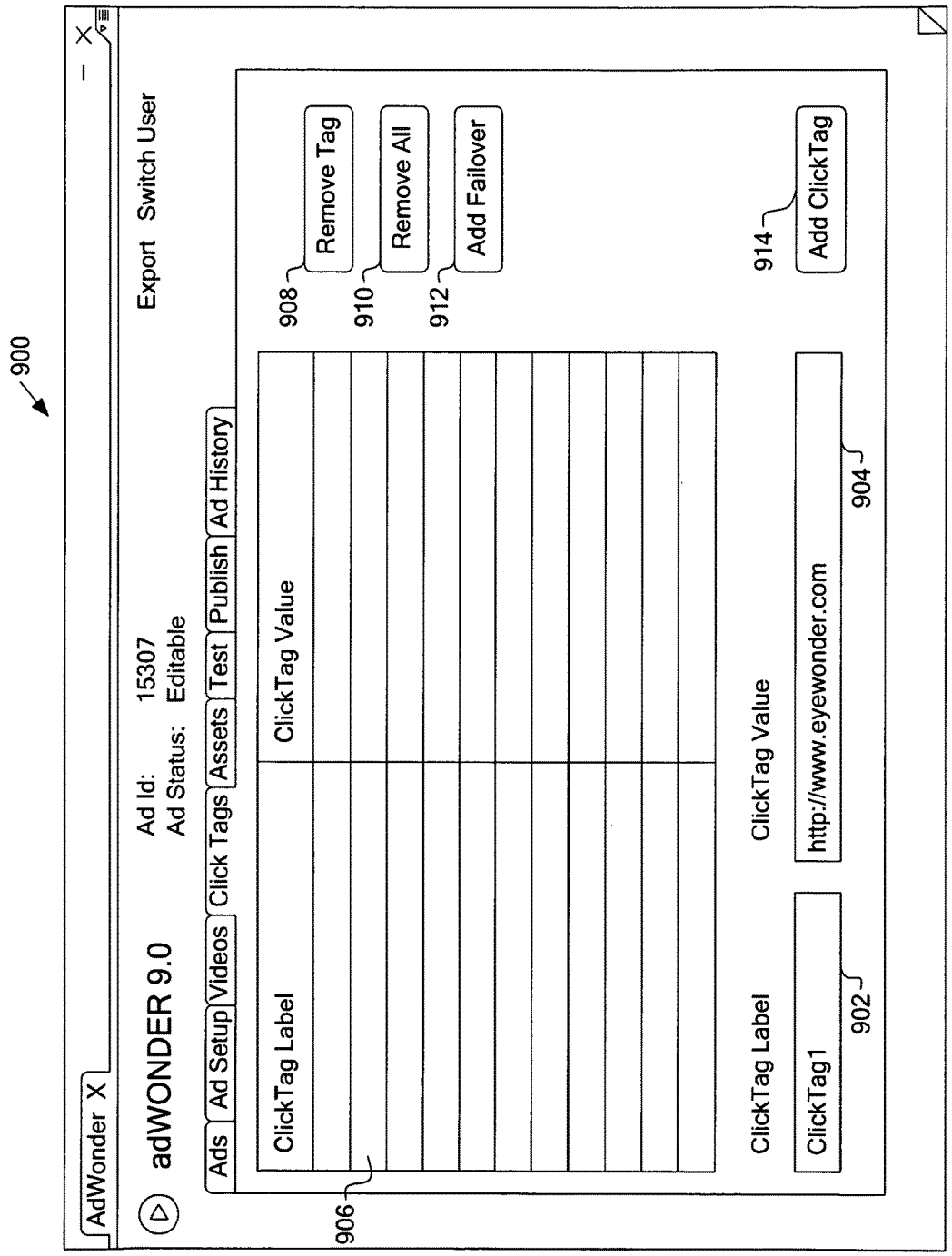

FIG. 9 is an example screenshot for indicating one or more tracking or clickthrough objects for an advertising unit using one or more creative application program tools in accordance with an embodiment of the invention. In this embodiment, a user interface 900 provides one or more options to indicate tracking or clickthrough objects for a particular advertising unit. Tracking or clickthrough objects can include, but are not limited to, links embedded in an advertising unit, links associated with a video or other ad content, and links associated with a particular location of an advertising unit. Tracking or clickthrough objects can be referred to, collectively or individually, as a tracking tool. In one example, a series of fields 902, 904 can be provided for a user to indicate one or more click tag labels (ClickTag Labels) and click tag values (ClickTag Values) for an advertising unit. In the example shown, a click tag label, such as "clickTag1", and corresponding click tag value, such as "http://www.eyewonder.com", can be input by a user. When a user inputs a click tag label and corresponding click tag value, the click tag information can be stored and viewed in the upper field 906. Within the upper field 906, the click tag label and corresponding click tag value can be reviewed and observed. In this example, such click tag labels and click tag values can be stored on a server, such as 120 in FIG. 1, or database associated with a server, such as database 118. Other commands can permit a user to navigate through and edit the list of click tag labels and click tag values in the upper field 906 or lower fields 902, 904. In this example, such commands can include remove tag 908, remove all 910, add failover 912, and add click tag 914. Other examples of fields or commands to indicate one or more click tag labels and click tag values for an advertising unit, and configurations for such fields and commands can exist in other embodiments of the invention.

In one embodiment, a server such as 120 in FIG. 1 can track any number of user clicks on various tracking or clickthrough objects, or tracking tools. An ad unit component module or engine, such as 126 in FIG. 1, can provide various reporting capabilities for such tracking tools, and facilitate the preparation, formatting, and output of reports illustrating statistical information associated with tracking and/or clickthrough functionality for a particular advertising units or for a plurality of advertising units.

In one embodiment, a click tag called a failover can be created. In this example, the failover is an alternative link to associate with an advertising unit, video, or other ad content in the event an initial link is broken or otherwise does not suitably function.

Figure 10:
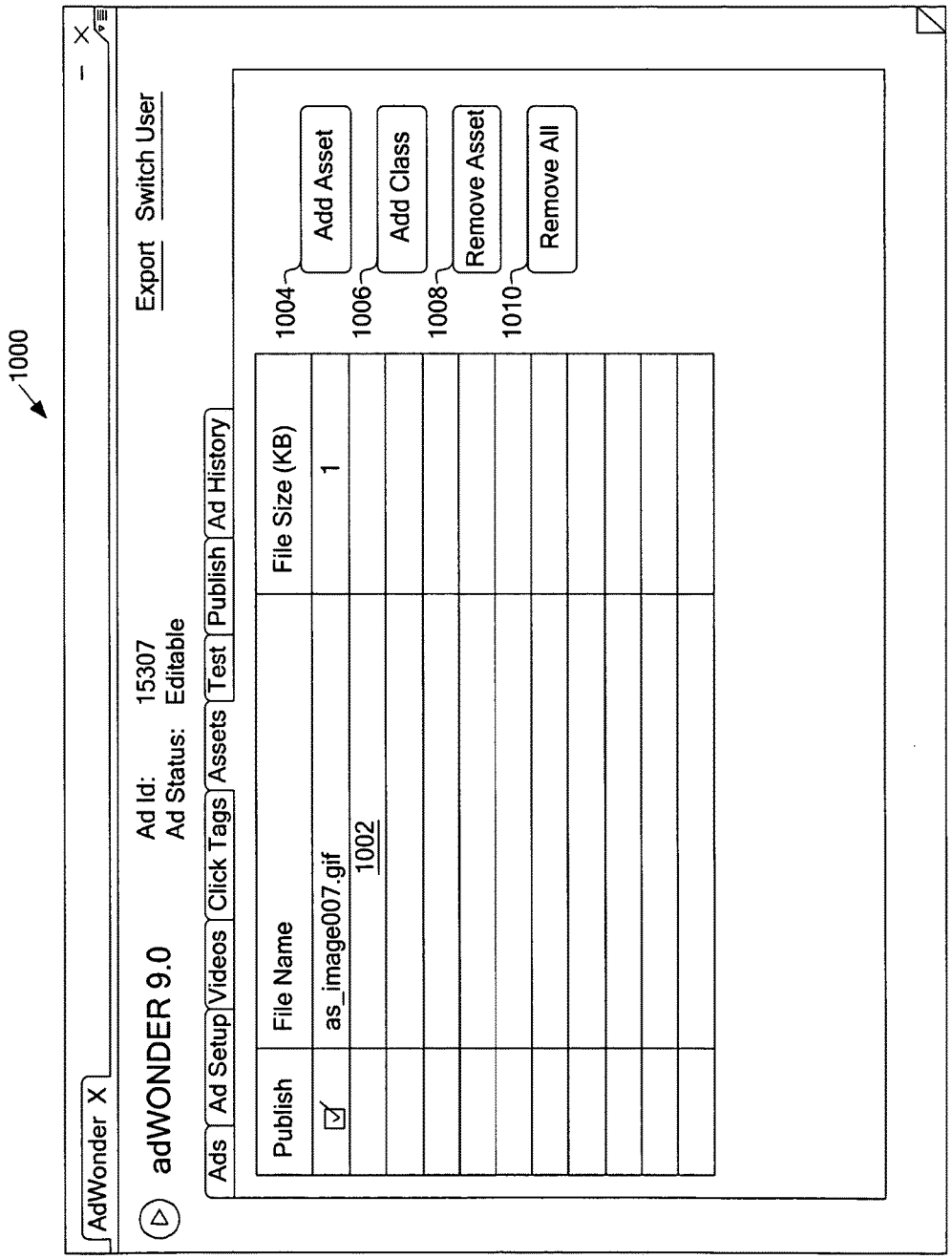

FIG. 10 is an example screenshot for selecting an image for an advertising unit using one or more creative application program tools in accordance with an embodiment of the invention. In this embodiment, a user interface 1000 provides a list and commands to indicate one or more images for a particular advertising unit. Images can include, but are not limited to, image files, child SWF files, FLA files, external AS (ActionScript) files, and other files or images to be associated with or for use in supporting an advertising unit. For example, a field 1002 can be provided for a user to indicate one or more images for publication with an advertising unit. In the example shown, an image, such as "as_image007.gif", can be selected by a user. When a user inputs an image, the image information can be stored and viewed in the field 1002. Within the field 1002, the image name and file size can be reviewed and observed. In this example, such image information can be stored on a server, such as 120 in FIG. 1, or database associated with a server, such as database 118. Other commands can permit a user to navigate through and edit the list of images in the field 1002. In this example, such commands can include ad asset 1004, add class 1006, remove asset 1008, and remove all 1010. Other examples of fields or commands to select a video for an advertising unit, and configurations for such fields and commands can exist in other embodiments of the invention.

Figure 11:
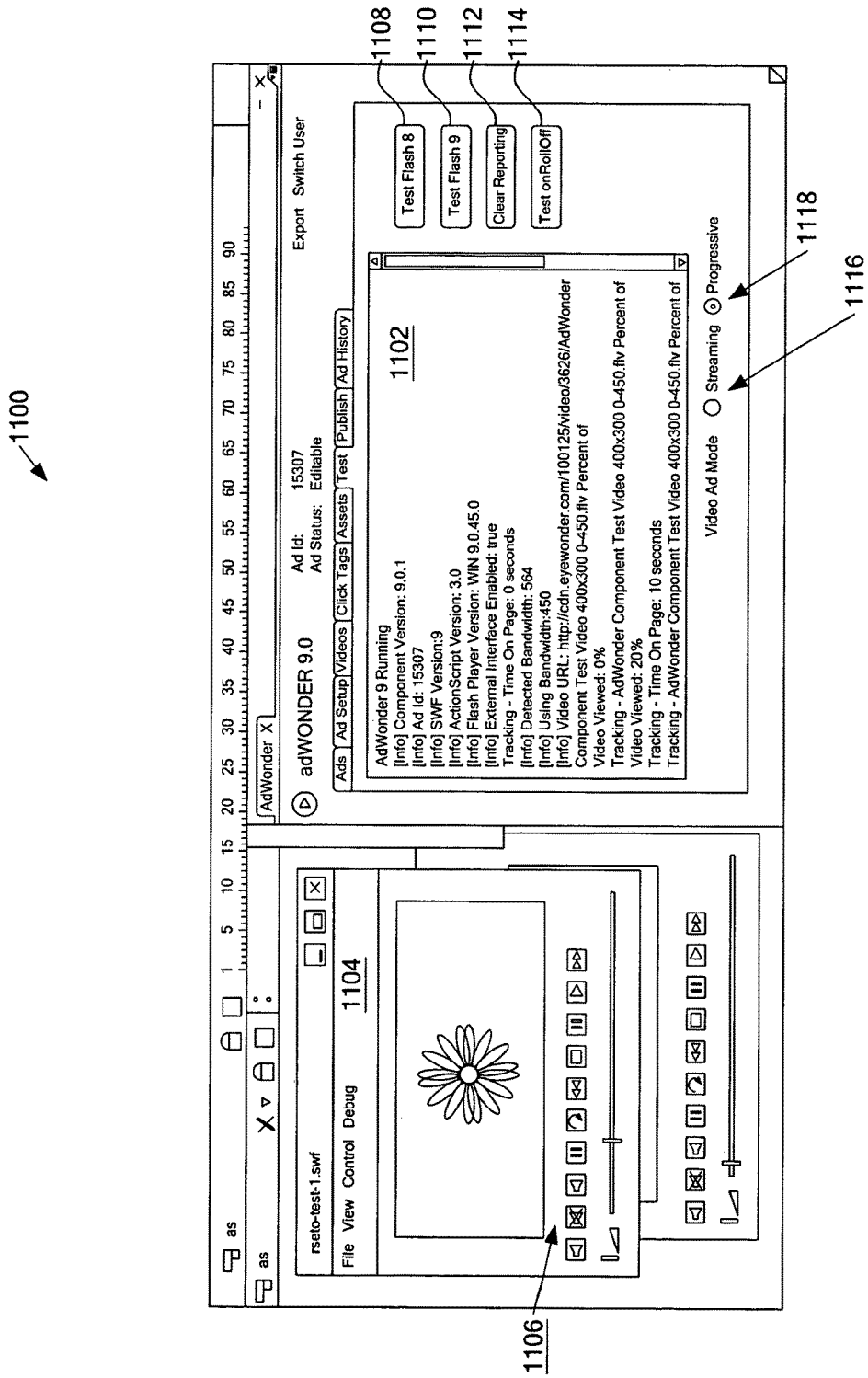

FIG. 11 is an example screenshot for testing and reviewing an advertising unit using one or more application program creative tools in accordance with an embodiment of the invention. In this embodiment, a user interface 1100 provides a test window to test and review a particular advertising unit in a single environment. For example, a field, such as a testing panel 1102, can be provided for a user to view various test operating characteristics associated with a particular advertising unit. Test operating characteristics can include, but are not limited to, the Flash application version, the advertising unit identification number, the SWF version, the ActionScript version, the Flash player version, available and currently used bandwidth, percent of advertising unit viewed, and time elapsed. In the example shown, a video entitled "rseto-test-1.swf" can be selected by a user and the video can be viewed in a new window 1104. Video player commands 1106, such as play, rewind, forward, pause, stop, volume control, mute, fast forward, and end, can be displayed adjacent to the new window. Adjacent to the testing panel 1102, one or more testing and review commands can be provided for selection. In this example, commands such as Test Flash 8 1108, Test Flash 9 1110, Clear Reporting 1112, and Test onRollOff 1114 can be provided. Additional commands such as the selection of a particular ad mode, streaming 1116 or progressive 1118, for testing of the advertising unit can also be provided. Other examples of fields or commands to select a video for an advertising unit, and configurations for such fields and commands can exist in other embodiments of the invention.

In one embodiment, a user can select a particular Flash environment to test and review an advertising unit in. For example, a user can select a Flash 8 environment to test a particular advertising unit in by way of selecting the Test Flash 8 command button 1108. Alternatively, a user can select a Flash 9 environment to test a particular advertising unit in by way of selecting the Test Flash 9 1110 command button. In either instance, the system will generate some or all the SWF files associated with the advertising unit, and test the advertising unit in the selected environment.

In one embodiment, a user can test and review the rollover and rolloff functionality of a particular advertising unit. For example, a user can select the Test onRollOff command button 1114, and the system can artificially generate the rollover and rolloff functionality detected by the underlying programming in the advertising unit. In another embodiment, the advertising unit can be transferred so that the rollover and rolloff functionality for the particular advertising unit can be tested online.

In one embodiment, a user can select additional reporting to be recorded by the system and to be displayed in the testing panel 1102. Additional reporting can include, but is not limited to, testing, and traces.

In one embodiment, a set of creative application program tools, such as drag and drop-type functions or commands, can be presented adjacent to a new window associated with the advertising unit. A user can modify or edit the advertising unit by way of manipulating one or more of the creative application program tools, such as dragging and dropping various objects onto the advertising unit in the new window. The system can store any modifications and edits provided by the user, and the modified advertising unit can be stored for subsequent retrieval, review, and testing.

Figure 12:
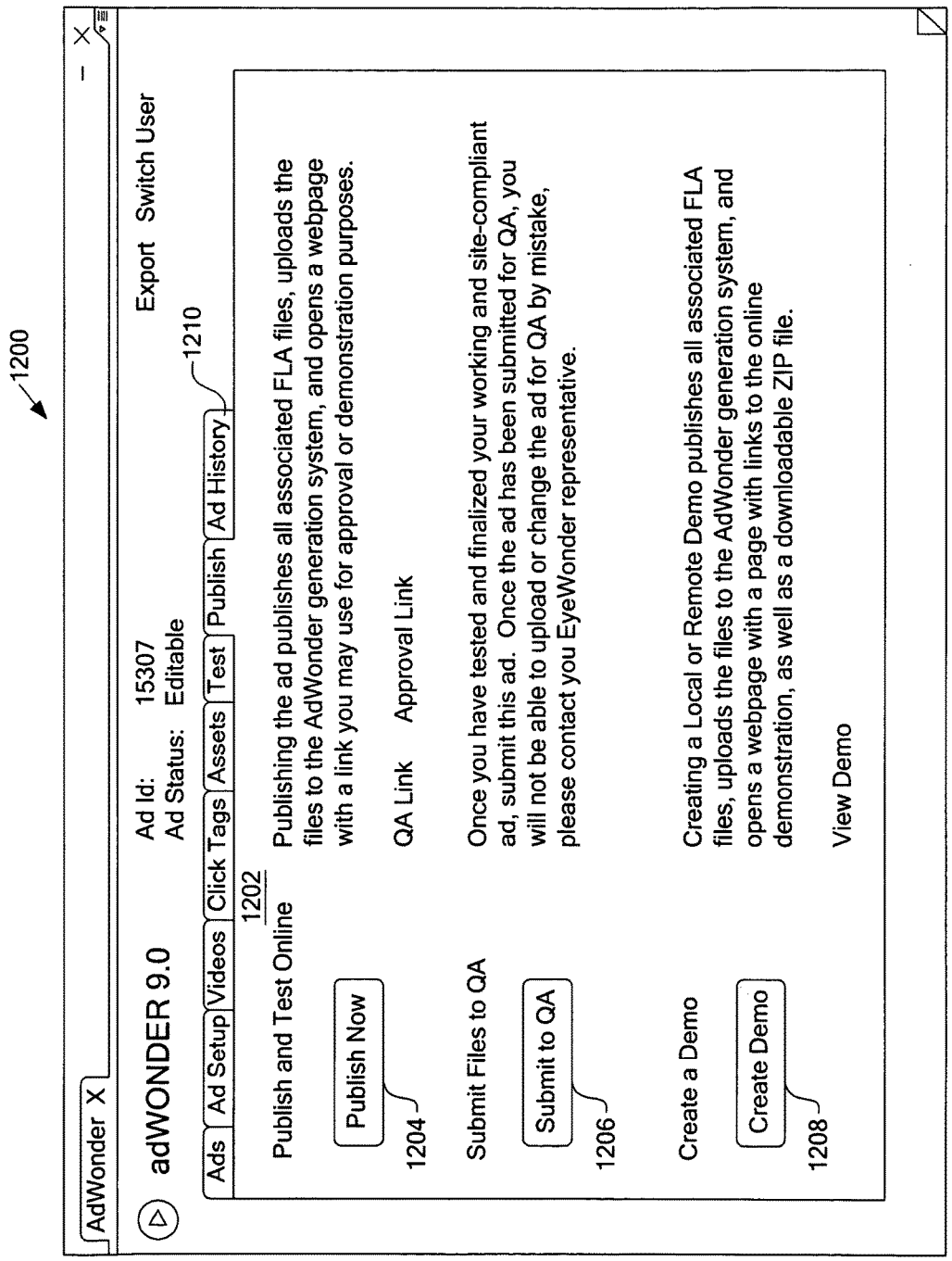

FIG. 12 is an example screenshot for transferring an advertising unit in accordance with an embodiment of the invention. In this embodiment, a user interface 1200 provides commands to transfer a particular advertising unit in a single environment. For example, a field 1202 can be provided for a user to view various command buttons to transfer a particular advertising unit. In the example shown, the field 1202 can include commands to Publish Now 1204, Submit to QA 1206, and Create Demo 1208. Other examples of fields or commands to transfer a video for an advertising unit, and configurations for such fields and commands can exist in other embodiments of the invention.

In one embodiment, a user can select the Publish Now 1204 command to proceed with publication of the advertising unit. For example, a user can select a particular advertising unit to transfer by way of selecting the Publish Now command button 1204. When selected, the system will proceed to transfer some or all associated FLA files, and upload the files to the ad unit generation module or engine 126. A link to the transferred advertising unit can be generated by the ad unit component module or engine 110, and the link can be provided to a user via a client device 104*a* for approval and/or demonstration.

In one embodiment, a user can submit the advertising unit to a quality control process. For example, a user can select the Submit to QA command button 1206, and the system can transmit the advertising unit to or otherwise facilitate a quality control process. In this instance, the advertising unit can be submitted to a designer for additional review and testing in accordance with a suitable quality control process.

In one embodiment, a user can create a demonstration for a particular advertising unit. For example, a user can select the Create Demo command button 1208, and the system can create a local or remote demo. In this instance, some or all associated FLA files can be published and uploaded to the ad unit generation module or engine 126 at the server 120. The ad unit component module or engine 126 can generate a webpage with one or more links to an online demonstration of the advertising unit of interest.

Another menu tab, such as Ad History 1210, can provide additional user commands and relevant information for generating, reviewing, and editing an advertising unit in a single environment, such as a Flash or Silverlight environment. In this example, when a user selects the tab 1210, a new webpage or field can be generated, and historical information associated with a particular advertising unit can be provided to a user.

While the above description contains many specifics, these specifics should not be construed as limitations on the scope of the invention, but merely as exemplifications of the disclosed embodiments. Those skilled in the art will envision many other possible variations that are within the scope of the invention as defined by the claims appended hereto.

The claimed invention is:

1. A method for generating an advertising unit in a single environment, the method comprising:

executing, on a first client device, an ad unit component module program adapted to operate in the single environment, wherein the single environment allows a first user and a second user to process an advertising unit in real-time;

simultaneously executing an authoring tool program to provide video or animation editing functionality within the single environment, wherein:

the authoring tool program receives video or animation content generated by the first user at the first client device, and the authoring tool program utilizes scripting language;

utilizing, by the first user, a creative application program tool associated with the ad unit component module program to generate the advertising unit including the video or animation content in the single environment, wherein the advertising unit is an electronic advertisement configured to be associated with at least one webpage and viewed on a display device when the webpage is downloaded to the display device;

within the single environment, transferring one or more files associated with the advertising unit in real-time from the first user to the second user, wherein one or more files associated with the advertising unit are transmitted via a server to a second client device associated with the second user for editing at least a portion of the video or animation content in the advertising unit using the same authoring tool program within the single environment;

within the single environment, receiving by the first user edited user-generated video or animation content for the advertising unit from the second user operating the second client device, wherein the edited user-generated video or animation content is adapted to modify the original advertising unit sent from the first user to the second user;

within the single environment, publishing the advertising unit to initiate placement for viewing outside the single environment;

utilizing at least one tracking tool associated with the ad unit component module program, wherein:

the at least one tracking tool is programmed to collect indications of viewer interaction associated with the advertising unit after placement, and the viewer interaction is outside the single environment; and providing the indications to the single environment.

2. The method of claim 1, wherein the authoring tool program comprises a scripting language.

3. A method for manipulating an advertising unit in a single environment, the method comprising:

simultaneously executing an ad unit component module program and an authoring tool program, wherein the authoring tool program is adapted to facilitate execution of the ad unit component module program in the single environment, wherein the single environment allows a first user and a second user to collectively process an advertising unit in real-time;

wherein the authoring tool program is adapted by the ad unit component module program to provide video or animation editing functionality associated with authoring tool program, wherein the functionality is provided within the single environment, wherein the authoring tool program receives video or animation content generated by a first user;

within the single environment, the first user generating an advertising unit including the user-generated video or animation content with at least one tool associated with the ad unit component module program, wherein the advertising unit is an electronic advertisement configured to be associated with at least one webpage and viewed on a display device when the webpage is downloaded to the display device, further wherein one or more files associated with the advertising unit are transmitted via a server to the second user associated with a second client device for editing at least a portion of the user-generated video or animation content in the advertising unit using the same authoring tool program within the single environment;

within the single environment, receiving by the first user edited user-generated video or animation content for the advertising unit from the second user;

within the single environment, modifying the advertising unit based at least in part on the received edited user-generated video or animation content;

within the single environment, publishing the advertising unit to initiate placement for viewing outside the single environment;

utilizing at least one tracking tool associated with the ad unit component module program, wherein:

the at least one tracking tool is programmed to collect indications of viewer interaction associated with the advertising unit after placement, and the viewer interaction is outside the single environment; and providing the indications to the single environment.

4. The method of claim 3, further comprising: storing the advertising unit.

5. The method of claim 3, further comprising;

within the single environment, transferring one or more files associated with the advertising unit to the at least one server.

6. The method of claim 3, wherein the authoring tool program comprises a scripting language.

7. The method of claim 3, wherein the at least one tool comprises a creative application program tool.

8. A computer program product for generating an executable advertising unit in a single environment, the computer program product comprising:

at least one computer-readable medium comprising a computer executable program instructions, the computer executable program instructions comprising an ad generation component module program and an authoring tool program;

the ad generation component module program adapted to operate in the single environment, wherein the single environment allows a first user and a second user to collectively process the executable advertising unit in real-time;

the authoring tool program adapted to facilitate the single environment, and further adapted to simultaneously execute with the ad generation component module, wherein the authoring tool program is adapted by the ad generation component module program to provide video or animation editing functionality associated with authoring tool program, wherein the authoring tool program receives video or animation content generated by the first user;

wherein the ad generation component module program comprises at least one tool adapted to generate an advertising unit including the user-generated video or animation content in the single environment, wherein the advertising unit is an electronic advertisement configured to be associated with at least one webpage and viewed on a display device when the webpage is downloaded to the display device, further wherein one or more files associated with the advertising unit are transmitted via a server to the second user operating a second client device for editing at least a portion of the video or animation content in the advertising unit using the same authoring tool program within the single environment, wherein, in the single environment, receiving by the first user edited user-generated video or animation content for the advertising unit from the second user;

an ad publication component to initiate placement for viewing outside the single environment; and at least one tracking tool associated with the ad generation component module program, wherein the at least one tracking tool is programmed to:
  collect indications of viewer interaction associated with the advertising unit after placement outside the single environment, and
  provide the indications to the single environment.

9. The computer program product of claim 8, wherein the authoring tool program comprises a scripting language.

10. The computer program product of claim 8, wherein the at least one tool further comprises a creative application program tool.

11. The computer program product of claim 8, wherein the ad generation component module program is further adapted to receive edited user-generated video or animation content for modification of the advertising unit.

12. A method for generating an advertising unit in a single environment, the method comprising:
  executing, on a first client device, an ad unit component module program adapted to operate in the single environment, wherein the single environment allows a first user and a second user to collectively process an advertising unit in real-time;
  simultaneously executing an authoring tool program to provide video or animation editing functionality within the single environment, wherein the authoring tool program receives video or animation content generated by the first user;
  utilizing at least one tool associated with the ad unit component module program, to generate the advertising unit including the user-generated video or animation content in the single environment,
  wherein the advertising unit is an electronic advertisement configured to be associated with at least one webpage and viewed on a display device when the webpage is downloaded to the display device,
  further wherein one or more files associated with the advertising unit are transmitted via a server to the second user operating a second client device for editing at least a portion of the video or animation content in the advertising unit using the same authoring tool program within the single environment;
  within the single environment, publishing the advertizing unit to initiate placement for viewing outside the single environment;
  utilizing at least one tracking tool associated with the ad unit component module program, wherein:
    the at least one tracking tool is programmed to collect indications of viewer interaction associated with the advertising unit after placement, and
    the viewer interaction is outside the single environment; and
    providing the indications to the single environment.

13. The method of claim 1, wherein utilizing the creative application program tool comprises embedding one or more tracking or clickthrough objects in the advertising unit, and the at least one tracking tool is further programmed to collect indications of an interaction with the one or more tracking or clickthrough objects.

14. The method of claim 1, wherein utilizing the creative application program tool comprises selecting a rollover and/or rolloff functionality of the advertising unit, and the at least one tracking tool is further programmed to collect indications of an interaction with the rollover and/or rolloff functionality.

15. The method of claim 3, wherein generating the advertising unit comprises embedding one or more tracking or clickthrough objects in the advertising unit, and the at least one tracking tool is further programmed to collect indications of an interaction with the one or more tracking or clickthrough objects.

16. The method of claim 3, wherein generating the advertising unit comprises selecting a rollover and/or rolloff functionality of the advertising unit, wherein the at least one tracking tool is further programmed to collect indications of an interaction with the rollover and/or rolloff functionality.

17. The method of claim 8, wherein the at least one tool of the ad generating component module program is programmed to embed one or more tracking or clickthrough objects in the advertising unit, and the at least one tracking tool is further programmed to collect indications of an interaction with the one or more tracking or clickthrough objects.

18. The method of claim 8, wherein the at least one tool of the ad generating component module program is programmed to select a rollover and/or rolloff functionality of the advertising unit, and the at least one tracking tool is further programmed to collect indications of an interaction with the rollover and/or rolloff functionality.

19. The method of claim 12, wherein utilizing the at least one tool associated with the ad unit component module program comprises embedding one or more tracking or clickthrough objects in the advertising unit, and the at least one tracking tool is further programmed to collect indications of an interaction with the one or more tracking or clickthrough objects.

20. The method of claim 12, wherein utilizing the at least one tool associated with the ad unit component module program comprises selecting a rollover and/or rolloff functionality of the advertising unit, and the at least one tracking tool is further programmed to collect indications of an interaction with the rollover and/or rolloff functionality.

21. The method of claim 1, wherein the processing of the advertising unit in real-time comprises the first user generating, reviewing, editing, and transmitting an advertising unit to a second user in real-time by way of a single creative application program tool, and responsive to receiving the advertising unit at a client device of the second user, the second user modifying, reviewing, and editing the received advertising unit and transferring the received advertising unit back to the first user for viewer interaction outside the single environment.

22. The method of claim 3, wherein the processing of the advertising unit in real-time comprises the first user generating, reviewing, editing, and transmitting an advertising unit to a second user in real-time by way of a single creative application program tool, and responsive to receiving the advertising unit at a client device of the second user, the second user modifying, reviewing, and editing the received advertising unit and transferring the received advertising unit back to the first user for viewer interaction outside the single environment.

23. The computer program product of claim 8, wherein the processing of the advertising unit in real-time comprises the first user generating, reviewing, editing, and transmitting an advertising unit to a second user in real-time by way of a single creative application program tool, and responsive to receiving the advertising unit at a client device of the second user, the second user modifying, reviewing, and editing the received advertising unit and transferring the received advertising unit back to the first user for viewer interaction outside the single environment.

24. The method of claim 12, wherein the processing of the advertising unit in real-time comprises the first user generating, reviewing, editing, and transmitting an advertising unit to a second user in real-time by way of a single creative application program tool, and responsive to receiving the advertising unit at a client device of the second user, the second user modifying, reviewing, and editing the received advertising unit and transferring the received advertising unit back to the first user for viewer interaction outside the single environment.

* * * * *